(12) United States Patent
Miyata et al.

(10) Patent No.: US 6,974,500 B2
(45) Date of Patent: Dec. 13, 2005

(54) PRIMER COMPOSITION

(75) Inventors: Akihiro Miyata, Kanagawa Prefecture (JP); Kazunori Ishikawa, Kanagawa Prefecture (JP); Hideyuki Matsuda, Kanagawa Prefecture (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 197 days.

(21) Appl. No.: 10/642,161

(22) Filed: Aug. 18, 2003

(65) Prior Publication Data

US 2004/0039113 A1 Feb. 26, 2004

(30) Foreign Application Priority Data

Aug. 26, 2002 (JP) ........................................ 2002-244924

(51) Int. Cl.⁷ .............................. C07F 7/02; C07F 7/10; C07F 7/16
(52) U.S. Cl. .............................. 106/287.11; 106/287.13; 106/287.14; 556/407; 556/408; 556/413; 556/427; 556/429; 556/437; 556/441; 556/443; 556/444
(58) Field of Search ........................ 106/287.11, 187.13, 106/187.14; 556/407, 408, 413, 427, 429, 437, 441, 443, 444

(56) References Cited

U.S. PATENT DOCUMENTS

| | | | | |
|---|---|---|---|---|
| 4,031,120 A | * | 6/1977 | Gervase | 556/414 |
| 5,576,558 A | * | 11/1996 | Matsuda et al. | 252/182.2 |
| 6,281,322 B1 | * | 8/2001 | Groth et al. | 528/28 |
| 6,288,198 B1 | * | 9/2001 | Mechtel et al. | 528/28 |
| 6,444,325 B1 | * | 9/2002 | Roesler et al. | 428/447 |
| 6,765,055 B2 | * | 7/2004 | Ishikawa et al. | 524/588 |

\* cited by examiner

*Primary Examiner*—David Brunsman
(74) *Attorney, Agent, or Firm*—Rader, Fishman & Grauer PLLC

(57) ABSTRACT

To provide a primer composition having an excellent balance between storage stability and adhesiveness, while permitting a longer open time. The primer composition includes: a compound (a) represented by the following formula (1):

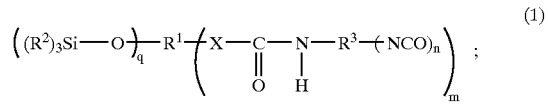

and an organic solvent (b).

3 Claims, No Drawings

PRIMER COMPOSITION

BACKGROUND OF THE INVENTION

1. Field of the Invention

The present invention relates to a primer composition. More particularly, the present invention relates to a primer composition capable of retaining its excellent adhesiveness to an adherend for a long period of time after the application of the primer composition even at high temperatures and high humidities.

2. Related Art

Bonding between a body and a windshield or the like of an automobile requires a high adhesion strength and a high adhesion durability under various conditions of low temperature, high temperature, high humidity, and so on. A typical example of sealants useful for such an application is an urethane-based sealant. However, the sealant may not reach a desired safety target or a desired structural target, so that in most body assembly operations the coating of such a sealant is generally preceded by the coating of a primer in bonding a windshield or rear window glass on the body of an automobile.

As the primer, heretofore, a primer that contains a film-forming component such as polyester polyurethane or an acrylic resin blended with a silane-coupling agent, a polyisocyanate compound, carbon black, or the like has been known in the art.

Even though the conventional primer composition has sufficient storage stability, there are following problems. That is, because the conventional primer composition uses a free isocyanate group (an NCO group) in the polyisocyanate compound as an adhesive component, the adhesiveness of the primer composition will tend to be decreased by atmospheric humidity when the primer composition is left alone for a long time period from the application of the primer composition to the application of the sealant. Therefore, a sufficient open time is hardly obtained, so that the workability of the primer composition will become poor.

In addition, a longer open time requires the NCO group having a smaller activity, so that a balance with the adhesiveness tends to be deteriorated as the open time becomes longer. In other words, heretofore, there has been no primer composition that can satisfy both the desired adhesiveness and the desired open time. Here, the term "open time" refers to a time period from the application of a primer composition on an adherend to the application of a sealant on the primer-applied adherend.

SUMMARY OF THE INVENTION

An object of the present invention is to provide a primer composition having an excellent balance between storage stability and adhesiveness, while permitting a longer open time.

The inventors of the present invention have made extensive studies and have finally found that each of a primer composition which could be prepared by blending a compound having an NCO group and an Si—O—$R^1$ bond in its molecule and a primer composition which could be prepared by blending a polyisocyanate compound with a compound having an Si—O—$R^1$ bond had an excellent balance between storage stability and adhesiveness and retained its adhesiveness for a long period of time even at high temperatures and high humidities after the application. Thus, the present invention has been completed. That is, the present invention provides the following primer compositions (1) to (3).

According to the present invention, there is provided
(1) a primer composition including:
a compound (a) represented by the following formula (1)

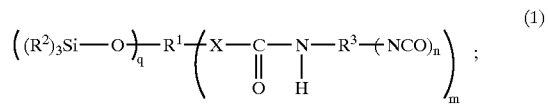

(where: m denotes an integral number of 1 to 3; n denotes an integral number of 1 to 4; q denotes an integral number of 1 to 3; $R^1$ denotes an aliphatic or aromatic hydrocarbon group, which may contain at least one hetero element selected from the group consisting of O, N, and S; $R^2$ denotes a monovalent aliphatic or aromatic hydrocarbon group, which may contain at least one hetero element selected from the group consisting of O, N, and S; $R^3$ denotes a residue obtained by removing all of isocyanate groups from an isocyanate compound; and X denotes an oxygen or sulfur atom, or —N($R^4$)—, where $R^4$ denotes a hydrogen atom, an alkyl group having 1 to 18 carbon atoms or an aryl group having 6 to 18 carbon atoms); and
an organic solvent (b).

Further, according to the present invention, there is provided
(2) a primer composition including:
a compound (a') represented by the following formula (2),

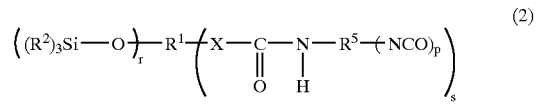

(where: s denotes an integral number of 0 to 3; p denotes an integral number of 0 to 4; r denotes an integral number of 1 to 4, where s and r satisfy a relationship of s+r≧2; $R^1$ denotes an aliphatic or aromatic hydrocarbon group, which may contain at least one hetero element selected from the group consisting of O, N, and S; $R^2$ denotes a monovalent aliphatic or aromatic hydrocarbon group, which may contain at least one hetero element selected from the group consisting of O, N, and S; $R^5$ denotes a residue obtained by removing all of isocyanate groups from an isocyanate compound; and X denotes an oxygen or sulfur atom, or —N($R^4$)—, where R4 denotes a hydrogen atom, an alkyl group having 1 to 18 carbon atoms or an aryl group having 6 to 18 carbon atoms);
an organic solvent (b); and
a polyisocyanate compound (c).

Furthermore, according to the present invention, there is provided
(3) the primer composition as described in (2) above, in which the polyisocyanate compound (c) is a compound represented by the following formula (3)

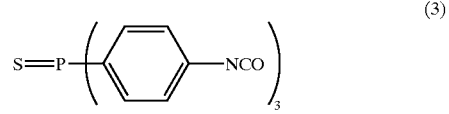

DESCRIPTION OF THE PREFERRED EMBODIMENTS

Hereinafter, a primer composition of the present invention, preferably for urethane-based sealant, will be described in detail.

The present invention relates to a primer composition including: a compound (a) represented by the following formula (1); and an organic solvent (b), and a primer composition including: a compound (a') represented by the following formula (2); an organic solvent (b); and a polyisocyanate compound (c), which are blended with each other.

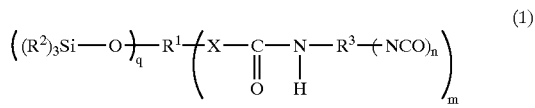

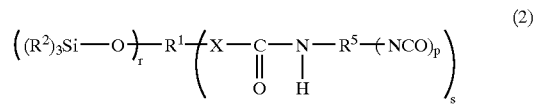

The above compounds (a) and (a') are those represented by the above formulas (1) and (2), respectively.

In those formulas, m is an integral number of 1 to 3 and s is an integral number of 0 to 3.

In addition, n is an integral number of 1 to 4, and in particular, n is preferably an integral number of 1 to 3 in terms of adhesiveness and storage stability. Furthermore, p is an integral number of 0 to 4. Here, P=0 means that the above compound (a') has no NCO group.

Furthermore, q is an integral number of 1 to 3 and r is an integral number of 1 to 4. However, s and r satisfy a relationship of s+r≧2.

$R^1$ represents an aliphatic or aromatic hydrocarbon group having 2 or more valences, preferably one having 2 to 36 carbon atoms, more preferably one having 2 to 18 carbon atoms, and it may be branched. In addition, $R^1$ may contain at least one hetero element selected from the group consisting of O, N, and S.

As specific examples of $R^1$, aliphatic hydrocarbon groups such as a methylene group, an ethylene group, a 1,3-propylene group, a 1,4-butylene group, a 2-ethyl-1,3-propylene group, a propane-1,2,3-triyl group, a butane-1,2,4-triyl group, polyoxypropylene, polyoxyethylene, and a 1,1,1-trimethylenepropyl (trimethylolpropane residue) group; and aromatic hydrocarbon groups such as a 1,4-phenylene group, a 2,6-naphthalene group, a 4-methyl-1,3-phenylene group, and a 1,4-phenylenebis(methylene) group can be given.

Furthermore, $R^2$ represents a monovalent aliphatic or aromatic hydrocarbon group, preferably one having 1 to 18 carbon atoms, more preferably one having 1 to 12 carbon atoms, and it may be branched. In addition, $R^2$ may contain at least one hetero element selected from the group consisting of O, N, and S.

As specific examples of $R^2$, monovalent aliphatic hydrocarbon groups such as a methyl group, an ethyl group, a propyl group, a butyl group, an isobutyl group, a pentyl group, a hexyl group, a 2-ethylhexyl group, and a dodecyl group; and monovalent aromatic hydrocarbon groups such as a phenyl group, a toluyl group, a dimethylphenyl group, a benzyl group, and a naphthyl group can be given. Of those, the methyl group or the ethyl group is preferable as the $R^2$.

In the formula (1), $R^3$ is a residue prepared by removing all NCO groups from an isocyanate compound described below, and it may be either an aliphatic group or an aromatic group. The isocyanate compound may be an aromatic or aliphatic polyisocyanate compound, and the isocyanate compound is not particularly limited as far as it is provided as a compound having 2 to 5 NCO groups in the molecule. In the present invention, the term "aromatic polyisocyanate compound" means an isocyanate compound in which all of NCO groups are directly bonded to an aromatic ring, while the term "aliphatic polyisocyanate compound" means a polyisocyanate compound except the aromatic polyisocyanate compound.

As specific examples of the aromatic polyisocyanate compounds, 2,4- or 2,6-tolylene diisocyanate (TDI), 1,4-phenylene diisocyanate, 4,4'- or 2,4'-diphenylmethane diisocyanate (MDI), 1,5-naphthalene diisocyanate, tolidine diisocyanate, triphenylmethane triisocyanate, polymethylene polyphenyl isocyanate, carbodiimide-modified MDI, and a compound represented by the following formula (3) can be given.

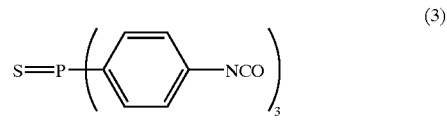

Next, as specific examples of the aliphatic polyisocyanate compounds, ethylene diisocyanate, propylene diisocyanate, tetramethylene diisocyanate, hexamethylene diisocyanate (HDI), isophorone diisocyanate (IPDI), xylylene diisocyanate, tetramethylxylylene diisocyanate (TMXDI), 1,6,11-undecane triisocyanate, 1,3,6-hexamethylene triisocyanate, bicycloheptane triisocyanate, trimethylhexamethylene diisocyanate, a hydrogenated compound of each of the above-mentioned aromatic polyisocyanate compounds, or isocyanurate forms, biuret forms, and adducts with polyhydric alcohols of those low molecular weight polyisocyanate compounds can be given.

As the isocyanurate form of the low molecular weight polyisocyanate compound, an isocyanurate form of HDI, an isocyanurate form of IPDI (represented by the following formula (4)), an isocyanurate form obtained from TDI and HDI, and the like are preferably shown.

As the adducts of the low molecular weight polyisocyanate compounds with the polyhydric alcohols, adducts in each of which trimethylolpropane is used as the polyhydric alcohol are preferably shown. Specifically, HDI-TMP adduct (represented by the following formula (5)) derived from 1,1,1-trimethylolpropane (TMP) and HDI, TMXDI-TMP adduct (represented by the following formula (6)) derived from TMP and TMXDI, and the like are preferably given.

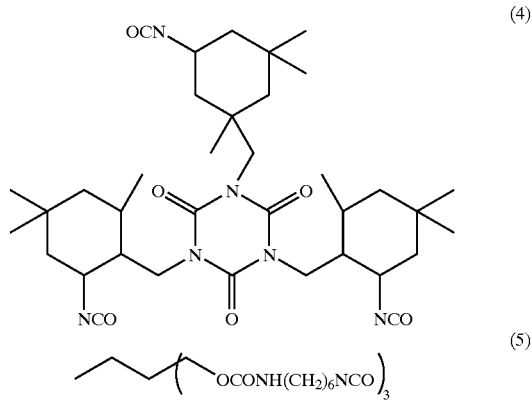

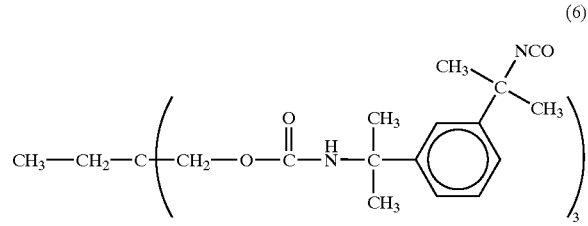

(6)

As the above-mentioned adduct, one commercially available under the trade name Saisen 3160 (manufactured by Mitsui-Cytec Co., Ltd.) may be used.

It is not required that each of those kinds of adducts be a complete OH/NCO adduct, and they may contain unreacted raw materials.

The $R^3$ is not particularly limited as long as it is a residue prepared by removing all of the NCO groups from the isocyanate compound described above. Specific examples thereof include: aromatic groups such as a tolylene group, a diphenylmethane group, a phenylene group, and a polymethylene polyphenylene group; aliphatic groups such as a hexamethylene group, a xylylene group, a tetramethylxylylene group, and an isophorone group; and further, isocyanurate-modified groups thereof.

$R^5$ is synonymous with $R^3$ when p is an integral number of 1 to 4. Specific examples of $R^5$ are preferably those exemplified for $R^3$.

In addition, when p is 0, $R^5$ is a residue prepared by removing an NCO group from a monoisocyanate compound and may be an aliphatic or aromatic group. The monoisocyanate compound may be an aromatic or aliphatic isocyanate compound. In the present invention, the term "aromatic isocyanate compound" means an isocyanate compound in which an NCO group is directly bonded to an aromatic ring, while the term "aliphatic isocyanate compound" means an isocyanate compound except the aromatic polyisocyanate compound, having one NCO group in the molecule thereof.

As specific examples of the aromatic isocyanate compound, phenyl isocyanate, 2-methoxyphenyl isocyanate, 3-methoxyphenyl isocyanate, 4-methoxyphenyl isocyanate, o-toluyl isocyanate, m-toluyl isocyanate, p-toluyl isocyanate, benzyl isocyanate, 1-naphthyl isocyanate, 2-biphenyl isocyanate, and the like can be given.

Next, as specific examples of the aliphatic isocyanate compound, ethyl isocyanate, n-propyl isocyanate, isopropyl isocyanate, n-butyl isocyanate, tert-butyl isocyanate, n-heptyl isocyanate, n-hexyl isocyanate, cyclohexyl isocyanate, and the like can be given.

In the case where p is 0, the $R^5$ is not particularly limited as long as it is a residue prepared by removing the NCO groups from the isocyanate compound described above. Specific examples thereof include: aromatic groups such as a phenyl group, a methoxyphenyl group, a toluyl group, a benzyl group, a 1-napthyl group, and a 2-biphenyl group; and aliphatic groups such as an ethyl group, a n-propyl group, an isopropyl group, a n-butyl group, a tert-butyl group, a n-heptyl group, a n-hexyl group, and a cyclohexyl group.

Further, X represents an oxygen atom, sulfur atom or —N($R^4$)—. Here, $R^4$ is a hydrogen atom, an alkyl group having 1 to 18 carbon atoms, or an aryl group having 6 to 18 carbon atoms, and is preferably a hydrogen atom, a methyl group, an ethyl group, a propyl group, a butyl group, or a phenyl group.

As a method of producing each of the compounds (a) and (a') represented by their respective formulas (1) and (2) described above, as described in examples below, an exemplified method may include reacting the NCO group of an isocyanate compound represented by the formula (4) or (5) with the hydroxyl group of a silane compound represented by the following formula (7) to prepare the compound (a) or (a') having an urethane bond, but the method is not limited thereto. Here, the above reaction is the same reaction as one well known in the art and generally used for synthesizing an urethane prepolymer from polyisocyanate and polyol.

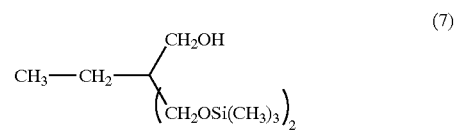

(7)

The above organic solvent (b) is not particularly limited as far as it is inert to the compounds (a) and (a') described above and a polyisocyanate compound (c) described below and has a suitable volatility.

Specifically, methyl ethyl ketone, ethyl acetate, butyl acetate, cellosolve acetate, mineral spirit, toluene, xylene, dimethylacetateamide, acetone, n-hexane, methylene chloride, tetrahydrofuran, ethyl ether, dioxane, and the like can be given. Of those organic solvents, methyl ethyl ketone and ethyl acetate are preferably used.

Each of those organic solvents may be used independently or in combination of two or more other organic solvents. It is preferable that the organic solvent be used after being completely dried out.

The content of the organic solvent (b) in the primer composition of the present invention is preferably 5% by weight or more. The content of the organic solvent varies depending on the application thereof. However, the content of the organic solvent can be adjusted that the solids concentration of the primer composition is preferably in the range of 10 to 50% by weight, more preferably 20 to 35% by weight. Wherein the solid means the components except organic solvent in the primer composition. The examples of the solids include the compounds (a), (a') and (c), film-forming resins, carbon black and the other additives.

Exemplary the preferable ratios of components of the present primer composition are as follows.

In the primer composition includes a compound (a) and an organic solvent (b), the compound (a) is 10 to 50 wt % based on the sum(100 wt %) of the compound (a)+the solvent (b).

In the primer composition includes a compound (a') a compound (c) and an organic solvent (b), the compound (a') is 0.1 to 10 wt % and the compound (c) is 10 to 30 wt % based on the amount(100 wt %) of solvent (b).

Specific examples of the above polyisocyanate compound (c) include isocyanate compounds such as the above aromatic polyisocyanate compounds and the above aliphatic polyisocyanate compounds. Among them, one or more compounds may be appropriately selected and used.

Among the above polyisocyanate compounds, because of a particularly excellent balance between adhesiveness and storage stability of the primer composition, the isocyanurate form of a low-molecular weight polyvalent isocyanate compound, the compound represented by the above formula (3), or the like is preferably used.

For providing favorable adhesiveness with various types of adherends, preferably, the primer composition contains a compound represented by the above formula (3) as the polyisocyanate compound (c). The content of the compound represented by the above formula (3) in the whole polyisocyanate compound (c) is preferably 0.5 to 60% by weight, more preferably 1 to 45% by weight, most preferably 1.5 to 35% by weight. In this range, an excellent balance between storage stability and adhesiveness is allowed, which is preferable. Furthermore, when the primer composition contains the compound represented by the above formula (3), a stabilizer such as diethyl malonate described below may be added to the composition.

When the above compound (a') and the polyisocyanate compound (c) are used in the primer composition of the present invention, the primer composition contains preferably 0.1 part by weight or more, more preferably 0.1 to 200 parts by weight of the compound (a') with respect to 100 parts by weight of the polyisocyanate compound (c). In this range, a particularly excellent balance between storage stability and adhesiveness can be attained.

The primer composition of the present invention may contain a film-forming resin if required. The film-forming resin is not particularly limited as far as it is film-formable while being low active or inert to the NCO group and may be one well known in the art. Specifically, preferable examples of the film-forming resin include an acrylic resin, a polyester-based polyurethane resin, a chlorinated rubber, and a terpene resin.

The content of the film-forming resin in the primer composition is preferably 1 to 20% by weight, more preferably 1 to 15% by weight, most preferably 1 to 10% by weight.

Furthermore, the primer composition of the present invention may also contain carbon black if required. The carbon black is capable of blocking or absorbing ultraviolet light or visible light, so that the antiweatherability of the primer composition can be obtained when the carbon black is included therein.

The carbon black to be used in the present invention is not particularly limited, and the examples of the carbon black include N110, N220, N330, N550, and N770 or mixtures thereof as specified by the American Society for Testing Materials (ASTM).

The content of the carbon black in the primer composition is preferably 5 to 40% by weight, more preferably 10 to 30% by weight, most preferably 10 to 25% by weight in view of dispersibility.

Furthermore, the primer composition may contain one or more other additives if required.

The additives include: inorganic pigments such as lamp black, titanium white, red oxide, titanium yellow, chinese white, red lead, cobalt blue, iron black, and aluminum powder; organic pigments such as Neo Zabon Black RE, Neo Black RE, Orazole Black CN, Orazole Black Ba (all manufactured by Ciba-Geigy Japan Limited), and Spiron Blue 2BH (manufactured by Hodogaya Chemical Co., Ltd.); and ultraviolet absorbers such as Cyasorb (Cyasorb UV24 Light Absorber, manufactured by American Cyanamide Co., Ltd.), and Uvinul (Uvinul D-49, D-50, N-35, and N-539, manufactured by General Aniline). If one or more of those additives are contained in the primer composition, the ultraviolet or visible light may be blocked or absorbed, which is effective for an improvement in the light stability.

In addition, the primer composition of the present invention may contain a catalyst such as tertiary amine, and an organic tin compound. Furthermore, it may contain: fillers such as glass powder, clay, powdered silica gel, ultrafine powdery silicic acid, or molecular sieves (also having water-absorbing ability); a thickening agent; a plasticizer such as butyl benzyl phthalate, dioctyl phthalate, dibutyl phthalate, or paraffin chloride; or a stabilizer such as diethyl malonate.

The method of producing the primer composition of the preset invention is not particularly restricted. For instance, it is prepared by appropriately dissolving the above compound (a), the organic solvent (b), the polyisocyanate compound (c) to be added if required, and other additives such as carbon black in an organic solvent and sufficiently kneading the resultant solution using a mixer such as a ball mill to effect uniform dispersion.

The primer composition of the present invention obtained as described above has an excellent balance between storage stability and adhesiveness. In addition, after the application, the primer composition obtained as described above retains favorable adhesiveness to an adherend for a long period of time even at high temperatures and high humidities. The adhesive power of the primer composition of the present invention retains favorable adhesiveness under the conditions of hot water, chemicals, or the like.

Thus, the primer composition of the present invention is able to extend an open time, and there is no need to apply a sealant again even after taking much times for the application of the sealant, resulting in excellent workability.

The reason for which the primer composition of the present invention retains excellent adhesiveness to an adherend for a long period of time at high temperatures and high humidities is as follow. That is, even after the deactivation of the NCO group in a primer due to the moisture, hydroxyl groups, which can be generated by the hydrolysis of an Si—O—$R^1$ bond in the compound (a) or (a'), remain on the surface of the composition. It is considered the hydroxyl groups may be bonded with an adhesive agent/sealant having free NCO groups, so that a state is achieved in which many active sites for the urethane-based sealant applied from above the primer are present. Therefore, it is possible to take a longer open time.

EXAMPLES

Hereinafter, the present invention will be described in more detail with reference to examples. However, the present invention should not be construed as being limited thereto.

As the above compound (a) or (a'), each of the compounds MA1 to MA10 was synthesized by reacting an isocyanate compound, a silane compound, and optionally a stabilizer to be added if required according to the formulation shown in Table 1.

For synthesizing each of MA1 to MA10 described above, a silane compound was added to an ethyl acetate solution in which the solids concentration of the isocyanate compound was 75% by weight, and then the mixture was reacted at a temperature in the range of room temperature to 80° C. for 8 to 32 hours. Subsequently, ethyl acetate was added to a reaction mixture, such that the solids concentration of the reaction product containing an isocyanate compound and the silane compound would be adjusted to 50% by weight.

Furthermore, the amount of the stabilizer to be added if required was defined in terms of % by weight on the basis of the weight of the silane compound.

TABLE 1

| | Isocyanate compound | Silane compound | NCO/OH | Stabilizer |
| --- | --- | --- | --- | --- |
| MA1 | Desmodur RFE | TMP-2Si | 3/2 | — |
| MA2 | Desmodur RFE | TMP-2Si | 3/0.5 | — |
| MA3 | Desmodur RFE | TMP-2Si | 3/0.5 | 10 wt % |

TABLE 1-continued

|  | Isocyanate compound | Silane compound | NCO/OH | Stabilizer |
|---|---|---|---|---|
| MA4 | Desmodur RFE | TMP-2Si | 3/0.5 | 25 wt % |
| MA5 | IPDI isocyanurate form | TMP-2Si | 3/2 | — |
| MA6 | IPDI isocyanurate form | TMP-2Si | 3/0.5 | — |
| MA7 | HDI isocyanurate form | TMP-2Si | 3/2 | — |
| MA8 | HDI isocyanurate form | TMP-2Si | 3/0.5 | — |
| MA9 | HDI-TMP adduct | TMP-2Si | 3/2 | — |
| MA10 | HDI-TMP adduct | TMP-2Si | 3/0.5 | — |

<Components in Table 1>
(i) Isocyanate Compound

A compound represented by the above formula (3) (Desmodur RFE, manufactured by Sumitomo Bayer Urethane Co., Ltd.), a compound represented by the above formula (4) (IPDI isocyanurate form, manufactured by Degussa Huls Co., Ltd.), an HDI isocyanurate form (D170N, manufactured by Mitsui Takeda Chemicals, Inc.), and an HDI-TMP adduct represented by the above formula (5) (D160N, manufactured by Mitsui Takeda Chemicals, Inc.) were used.

(ii) Silane Compound

A compound (TMP-2Si) represented by the above formula (7) was synthesized by the following method and was used.

100 g of trimethylol propane was heated and dissolved at 80° C., and then 120.2 g of hexamethyl disilazane was dropped. After dropping, the resulting mixture was reacted for 5 hours while being subjected to deammoniation at 80° C. Consequently, the specified compound TMP-2Si was obtained.

(iii) Stabilizer

Diethyl malonate was used.

Examples 1 to 16

The compounds MA1 to MA10, a polyisocyanate compound, a polyester-based polyurethane resin, dibutyl tin dilaurate (DBTDL), carbon black, ethyl acetate, and diethyl malonate were mixed according to the respective formulations shown in Table 2. Then, each of the resulting mixtures was kneaded until it became uniform using a ball mill to prepare a composition.

Each of the resulting compositions was evaluated for storage stability and adhesiveness by the methods described below. The results are listed in Table 2 below.

<Storage Stability Test>

The resulting composition was placed in a sealed container and was then stored at 60° C. After 7 days and 5 weeks, the condition of the composition was observed. When no gelatinization or solidification was observed, the composition was evaluated as good and represented by a circle (○) in the table.

<Adhesiveness Test>

The obtained composition was applied on the surface of an acryl-coated iron plate and was then left to stand at 20° C. and 55% relative humidity (RH) for 5 minutes. Subsequently, the composition was further left to stand at 40° C. and 95% relative humidity for 21 days, followed by bringing a polyurethane-based sealant (WS95, manufactured by Yokohama Rubber Co., Ltd.) in a thickness of 3 mm into press contact with the composition-coated surface of the iron plate, providing a test piece.

Subsequently, a peeling test described below was performed using the test piece. The contact boundary between the adherend and the composition was observed.

In Table 2 described below, CF means that the sealant was cohesively failed, and PS means that the boundary between the sealant and the primer was failed. Furthermore, a numeric value represents the percentage (%) of the failed surface area per total-coating surface area. For example, PS90 represents that the composition was peeled off from the boundary with the surface of the adherend and the composition was cohesively failed in 90% of the coating surface and 10% thereof, respectively.

(1) Initial Adhesiveness

The test piece was left to stand for 72 hours under the conditions of 20° C. and 65% relative humidity. Subsequently, a peeling test was performed by cutting with a knife.

(2) Adhesiveness with Resistance to Hot Water

The test piece was left to stand for 72 hours under the conditions of 20° C. and 65% relative humidity. Subsequently, the test piece was immersed in hot water at 40° C. for 168 hours and was then subjected to a peeling test in the same manner as that of the above item (1).

(3) Adhesiveness with Heat Resistance

The test piece was left to stand for 72 hours under the conditions of 20° C. and 65% relative humidity. Subsequently, the test piece was left to stand in an oven at 80° C. for 168 hours, followed by performing a peeling test in the same manner as that of the above item (1). (4) Adhesiveness with Window-washer Solution Resistance The test piece was left to stand for 72 hours under the conditions of 20° C. and 65% relative humidity. Subsequently, the test piece was immersed in a 50% by weight-diluted window-washer solution at 20° C. for 168 hours, followed by performing a peeling test in the same manner as that of the above item (1).

Comparative Example 1

A composition was prepared using the formulation shown in Table 2 in the same manners as those of Examples 1 to 16. Then, the composition was evaluated for the storage stability and the adhesiveness. The results are listed in Table 2 below.

TABLE 2

(No. 1) (Component unit: weight ratio)

|  | NV | Example |  |  |  |  |  |
|---|---|---|---|---|---|---|---|
|  |  | 1 | 2 | 3 | 4 | 5 | 6 |
| MA1 | 50% | 3.4 | 3.4 |  |  |  |  |
| MA2 | 50% |  |  | 3.4 | 3.4 |  |  |
| MA3 | 50% |  |  |  |  | 3.5 |  |
| MA4 | 50% |  |  |  |  |  | 3.5 |
| MA5 | 50% |  |  |  |  |  |  |

TABLE 2-continued

| | | | | | | | |
|---|---|---|---|---|---|---|---|
| MA6 | 50% | | | | | | |
| MA7 | 50% | | | | | | |
| MA8 | 50% | | | | | | |
| MA9 | 50% | | | | | | |
| MA10 | 50% | | | | | | |
| Polyisocyanate 1 | 27% | 30.0 | 30.0 | 30.0 | 30.0 | 30.0 | 30.0 |
| Polyisocyanate 2 | 60% | 14.5 | 14.5 | 14.5 | 14.5 | 14.5 | 14.5 |
| Polyester-based polyurethane resin | 100% | 2.5 | 2.5 | 2.5 | 2.5 | 2.5 | 2.5 |
| Dibutyl tin dilaurate | 100% | 0.02 | 0.02 | 0.02 | 0.02 | 0.02 | 0.02 |
| | | | 15.0 | 15.0 | 15.0 | 15.0 | 15.0 |
| Carbon black | 100% | 15.0 | 52.0 | 52.0 | 52.0 | 52.0 | 52.0 |
| Ethyl acetate | — | 52.0 | 0.28 | | 0.07 | 0.03 | |
| Diethyl malonate | 100% | | | | | | |
| Total weight | — | 117.42 | 117.70 | 117.42 | 117.49 | 117.55 | 117.52 |
| NV (solids concentration) | — | 30.7% | 30.9% | 30.7% | 30.7% | 30.7% | 30.7% |
| <Storage stability> | | | | | | | |
| 60° C. × 7 days | | ○ | ○ | ○ | ○ | ○ | ○ |
| 60° C. × 5 weeks | | ○ | ○ | ○ | ○ | ○ | ○ |
| <Adhesiveness> 20° C., 55% RH × 5 minutes | | | | | | | |
| (1) Initial stage | | CF100 | CF100 | CF100 | CF100 | CF100 | CF100 |
| (2) Resistance to hot water | | CF100 | CF100 | CF100 | CF100 | CF100 | CF100 |
| (3) Heat resistance | | CF100 | CF100 | CF100 | CF100 | CF100 | CF100 |
| (4) Window-washer solution resistance | | CF100 | CF100 | CF100 | CF100 | CF100 | CF100 |
| 40° C., 95% RH × 21 days | | | | | | | |
| (1) Initial stage | | CF100 | CF100 | CF100 | CF100 | CF100 | CF100 |
| (2) Resistance to hot water | | CF100 | CF100 | CF100 | CF100 | CF100 | CF100 |
| (3) Heat resistance | | CF100 | CF100 | CF100 | CF100 | CF100 | CF100 |
| (4) Window-washer solution resistance | | CF100 | CF100 | CF100 | CF100 | CF100 | CF100 |

(No. 2) (Component unit: weight ratio)

| | | Example | | | | | |
|---|---|---|---|---|---|---|---|
| | NV | 7 | 8 | 9 | 10 | 11 | 12 |
| MA1 | 50% | | | | | | |
| MA2 | 50% | | | | | | |
| MA3 | 50% | | | | | | |
| MA4 | 50% | | | | | | |
| MA5 | 50% | 3.4 | | | | | |
| MA6 | 50% | | 3.4 | | | | |
| MA7 | 50% | | | 3.4 | | | |
| MA8 | 50% | | | | 3.4 | | |
| MA9 | 50% | | | | | 3.4 | |
| MA10 | 50% | | | | | | 3.4 |
| Polyisocyanate 1 | 27% | 30.0 | 30.0 | 30.0 | 30.0 | 30.0 | 30.0 |
| Polyisocyanate 2 | 60% | 14.5 | 14.5 | 14.5 | 14.5 | 14.5 | 14.5 |
| Polyester-based polyurethane resin | 100% | 2.5 | 2.5 | 2.5 | 2.5 | 2.5 | 2.5 |
| Dibutyl tin dilaurate | 100% | 0.02 | 0.02 | 0.02 | 0.02 | 0.02 | 0.02 |
| Carbon black | 100% | 15.0 | 15.0 | 15.0 | 15.0 | 15.0 | 15.0 |
| Ethyl acetate | — | 52.0 | 52.0 | 52.0 | 52.0 | 52.0 | 52.0 |
| Diethyl malonate | 100% | | | | | | |
| Total weight | — | 117.42 | 117.42 | 117.42 | 117.42 | 117.42 | 117.42 |
| NV (solids concentration) | — | 30.7% | 30.7% | 30.7% | 30.7% | 30.7% | 30.7% |
| <Storage stability> | | | | | | | |
| 60° C. × 7 days | | ○ | ○ | ○ | ○ | ○ | ○ |
| 60° C. × 5 weeks | | ○ | ○ | ○ | ○ | ○ | ○ |
| <Adhesiveness> 20° C., 55% RH × 5 minutes | | | | | | | |
| (1) Initial stage | | CF100 | CF100 | CF100 | CF100 | CF100 | CF100 |

TABLE 2-continued

|  |  |  |  |  |  |  |
|---|---|---|---|---|---|---|
| (2) Resistance to hot water | CF100 | CF100 | CF100 | CF100 | CF100 | CF100 |
| (3) Heat resistance | CF100 | CF100 | CF100 | CF100 | CF100 | CF100 |
| (4) Window-washer solution resistance | CF100 | CF100 | CF100 | CF100 | CF100 | CF100 |
| 40° C., 95% RH × 21 days | | | | | | |
| (1) Initial stage | CF100 | CF100 | CF100 | CF100 | CF100 | CF100 |
| (2) Resistance to hot water | CF100 | CF100 | CF100 | CF100 | CF100 | CF100 |
| (3) Heat resistance | CF100 | CF100 | CF100 | CF100 | CF100 | CF100 |
| (4) Window-washer solution resistance | CF100 | CF100 | CF100 | CF100 | CF100 | CF100 |

(No. 3) (Component unit: weight ratio)

|  |  | Example |  |  |  | Comparative Example |
|---|---|---|---|---|---|---|
|  | NV | 13 | 14 | 15 | 16 | 1 |
| MA1 | 50% | | | | | |
| MA2 | 50% | | 20.0 | 20.0 | 20.0 | |
| MA3 | 50% | | | | | |
| MA4 | 50% | | | | | |
| MA5 | 50% | | | | | |
| MA6 | 50% | | | | 17.5 | |
| MA7 | 50% | | | | | |
| NA8 | 50% | | | | | |
| MA9 | 50% | | | | | |
| MA10 | 50% | 3.4 | | | | |
| Polyisocyanate 1 | 27% | 30.0 | | | | 30.0 |
| Polyisocyanate 2 | 60% | 14.5 | 14.5 | 14.5 | | 14.5 |
| Polyester-based polyurethane resin | 100% | 2.5 | 2.5 | 2.5 | 2.5 | 2.5 |
| Dibutyl tin dilaurate | 100% | 0.02 | 0.02 | 0.02 | 0.02 | 0.02 |
| Carbon black | 100% | 15.0 | 15.0 | 15.0 | 15.0 | 15.0 |
| Ethyl acetate | — | 52.0 | 65.0 | 65.0 | 65.0 | 52.0 |
| Diethyl malonate | 100% | 0.07 | | 0.28 | 0.28 | |
| Total weight | — | 117.49 | 117.02 | 117.30 | 120.3 | 114.02 |
| NV (solids concentration) | — | 30.7% | 31.0% | 31.1% | 30.4% | 30.1% |
| <Storage stability> | | | | | | |
| 60° C. × 7 days | | ○ | ○ | ○ | ○ | ○ |
| 60° C. × 5 weeks | | ○ | ○ | ○ | ○ | ○ |
| <Adhesiveness> | | | | | | |
| 20° C., 55% RH × 5 minutes | | | | | | |
| (1) Initial stage | | CF100 | CF100 | CF100 | CF100 | CF100 |
| (2) Resistance to hot water | | CF100 | CF100 | CF100 | CF100 | CF100 |
| (3) Heat resistance | | CF100 | CF100 | CF100 | CF100 | CF100 |
| (4) Window-washer solution resistance | | CF100 | CF100 | CF100 | CF100 | CF100 |
| 40° C., 95% RH × 21 days | | | | | | |
| (1) Initial stage | | CF100 | CF100 | CF100 | CF100 | PS100 |
| (2) Resistance to hot water | | CF100 | CF100 | CF100 | CF100 | PS90 |
| (3) Heat resistance | | CF100 | CF100 | CF100 | CF100 | PS90 |
| (4) Window-washer solution resistance | | CF100 | CF100 | CF100 | CF100 | PS100 |

<Components in Table 2>

(i) Polyisocyanate 1

An ethyl acetate solution of a compound represented by the above formula (3) (27% by weight in solids concentration), commercially available under the name of Desmodur RFE (manufactured by Sumitomo Bayer Urethane Co., Ltd.), was used.

(ii) Polyisocyanate 2

A butyl acetate solution of an isocyanurate form composed of TDI and HDI (60% by weight in solids concentration), Desmodur HL (manufactured by Sumitomo Bayer Urethane Co., Ltd.), was used.

(iii) Polyester-based Polyurethane Resin

Pandex T-5205 (manufactured by Dainippon Ink & Chemicals, Inc.) was used.

(iv) Dibutyl Tin Dilaurate

DBTL (manufactured by Kanto Kagaku Co., Ltd.) was used.

(v) Carbon Black

Asahi Thermal (manufactured by Asahi Carbon Co., Ltd.) was used.

(vi) Ethyl Acetate (vii) Diethyl Malonate

Accordingly, the primer composition of the present invention has an excellent balance between storage stability and adhesiveness and retains good adhesiveness to an adherend for a long period of time even at high temperatures and high humidities after the application of the primer composition. Thus, the primer composition of the present invention is useful because a long open time can be ensured, compared with the conventional one.

What is claimed is:

1. A primer composition comprising:

a compound (a) represented by the following formula (1),

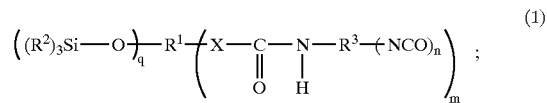

(wherein: m denotes an integral number of 1 to 3; n denotes an integral number of 1 to 4; q denotes an integral number of 1 to 3; $R^1$ denotes an aliphatic or aromatic hydrocarbon group, which may contain at least one hetero element selected from the group consisting of O, N, and S; $R^2$ denotes a monovalent aliphatic or aromatic hydrocarbon group, which may contain at least one hetero element selected from the group consisting of O, N, and S; $R^3$ denotes a residue obtained by removing all of isocyanate groups from an isocyanate compound; and X denotes an oxygen or sulfur atom, or —N($R^4$)—, where $R^4$ denotes a hydrogen atom, an alkyl group having 1 to 18 carbon atoms or an aryl group having 6 to 18 carbon atoms); and an organic solvent (b).

2. A primer composition comprising:

a compound (a') represented by the following formula (2),

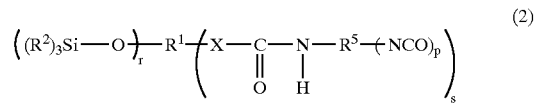

(wherein: s denotes an integral number of 0 to 3; p denotes an integral number of 0 to 4; r denotes an integral number of 1 to 4, where s and r satisfy a relationship of s+r≧2; $R^1$ denotes an aliphatic or aromatic hydrocarbon group, which may contain at least one hetero element selected from the group consisting of O, N, and S; $R^2$ denotes a monovalent aliphatic or aromatic hydrocarbon group, which may contain at least one hetero element selected from the group consisting of O, N, and S; $R^5$ denotes a residue obtained by removing all of isocyanate groups from an isocyanate compound; and X denotes an oxygen or sulfur atom, or —N($R^4$)—, where $R^4$ denotes a hydrogen atom, an alkyl group having 1 to 18 carbon atoms or an aryl group having 6 to 18 carbon atoms);

an organic solvent (b); and a polyisocyanate compound (c).

3. The primer composition according to claim 2, wherein the polyisocyanate compound (c) is a compound represented by the following formula (3):

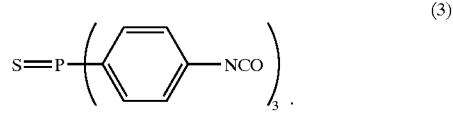

* * * * *